US009642458B2

(12) United States Patent
Wang et al.

(10) Patent No.: US 9,642,458 B2
(45) Date of Patent: May 9, 2017

(54) FIXING DEVICE

(71) Applicant: LEYARD OPTOELECTRONIC CO., LTD., Beijing (CN)

(72) Inventors: Jie Wang, Beijing (CN); Longhu Zhang, Beijing (CN)

(73) Assignee: LEYARD OPTOELECTRONICS CO., LTD., Beijing (CN)

( * ) Notice: Subject to any disclaimer, the term of this patent is extended or adjusted under 35 U.S.C. 154(b) by 133 days.

(21) Appl. No.: 14/655,171

(22) PCT Filed: Jul. 3, 2013

(86) PCT No.: PCT/CN2013/078767
§ 371 (c)(1),
(2) Date: Jun. 24, 2015

(87) PCT Pub. No.: WO2014/139251
PCT Pub. Date: Sep. 18, 2014

(65) Prior Publication Data
US 2015/0342343 A1  Dec. 3, 2015

(30) Foreign Application Priority Data

Mar. 14, 2013 (CN) .......................... 2013 1 0081786

(51) Int. Cl.
*A47B 81/06* (2006.01)
*A47B 57/56* (2006.01)
*F16M 11/22* (2006.01)

(52) U.S. Cl.
CPC .......... *A47B 81/064* (2013.01); *A47B 57/565* (2013.01); *F16M 11/22* (2013.01); *F16M 2200/02* (2013.01)

(58) Field of Classification Search
CPC ... A47B 81/064; A47B 81/061; A47B 81/062; A47B 81/065; A47B 81/06;
(Continued)

(56) References Cited

U.S. PATENT DOCUMENTS 525,162 A * 8/1894 Schwartz, Jr. ....... A47B 57/565
211/190
3,195,968 A * 7/1965 Freeman .............. A47B 47/042
217/65
(Continued)

FOREIGN PATENT DOCUMENTS

CN 2823768 Y 10/2006
CN 2936613 Y 8/2007
(Continued)

OTHER PUBLICATIONS

International Search Report; Dec. 19, 2013; issued in International Patent Application No. PCT/CN2013/078767.
(Continued)

*Primary Examiner* — Stanton L Krycinski
(74) *Attorney, Agent, or Firm* — Moore & Van Allen PLLC; Henry B. Ward, III

(57) ABSTRACT

A fixing device includes a pedestal (10), provided with a first chute (11) extending along a first direction, a first limiting part being provided in the first chute (11); a bracket (20), detachably provided on the pedestal (10), wherein a slide block (21) is provided on the bracket (20), a limited part adapted to the first limiting part in shape is provided on the slide block (21), and the first limiting part and the limited part form a buckled structure so as to fix the bracket (20) on the pedestal (10) along a vertical direction; and a connecting arm (30), wherein a first end of the connecting arm (30) is provided on the bracket (20), and a mounting part (31) connected with a display screen is provided at a second end of the connecting arm (30). By the matching between the slide block (21) and the first chute (11), the first limiting part and the limited part form the buckled structure, so that the fixing device is reusable and convenient to assemble and disassemble.

13 Claims, 10 Drawing Sheets

(58) Field of Classification Search
CPC ............ A47B 57/565; A47B 2097/005; A47B 2097/006; F16M 11/22; A47F 5/106
USPC .................................................. 211/162, 85.8
See application file for complete search history.

(56) References Cited

U.S. PATENT DOCUMENTS

| | | | | |
|---|---|---|---|---|
| 3,737,047 | A * | 6/1973 | Ruth | B65G 1/10 |
| | | | | 211/162 |
| 4,722,146 | A | 2/1988 | Kemeny | |
| 4,735,152 | A * | 4/1988 | Bricker | A47B 57/565 |
| | | | | 108/152 |
| 5,634,619 | A * | 6/1997 | Alessi | A47B 57/565 |
| | | | | 248/219.3 |
| 6,681,702 | B1 * | 1/2004 | Nicely | A47B 53/02 |
| | | | | 105/157.1 |
| 7,060,040 | B2 * | 6/2006 | Farmer | A47B 57/565 |
| | | | | 600/573 |
| 7,124,902 | B1 * | 10/2006 | Chen | A47B 53/02 |
| | | | | 211/151 |
| 7,165,497 | B2 * | 1/2007 | Gilbert | A47B 53/02 |
| | | | | 104/242 |
| 7,469,793 | B2 * | 12/2008 | Chen | A47B 53/02 |
| | | | | 211/162 |
| 7,484,631 | B2 * | 2/2009 | Bothun | A47B 53/02 |
| | | | | 211/162 |
| 7,523,715 | B2 * | 4/2009 | Mettler | A47B 23/042 |
| | | | | 116/63 R |
| 7,527,600 | B2 * | 5/2009 | Farmer | A47B 57/565 |
| | | | | 362/257 |
| 8,172,343 | B2 * | 5/2012 | Muth | A47B 53/02 |
| | | | | 312/201 |
| 9,178,347 | B2 * | 11/2015 | Myers | F16M 11/10 |
| 2004/0256339 | A1 * | 12/2004 | Welsch | A47B 53/02 |
| | | | | 211/162 |
| 2006/0076306 | A1 * | 4/2006 | Bothun | A47B 53/02 |
| | | | | 211/162 |
| 2009/0057501 | A1 * | 3/2009 | Huang | F16M 11/42 |
| | | | | 248/157 |
| 2013/0168335 | A1 * | 7/2013 | Gillespie | F16M 11/041 |
| | | | | 211/26 |

FOREIGN PATENT DOCUMENTS

| | | |
|---|---|---|
| CN | 200951736 Y | 9/2007 |
| CN | 200993891 Y | 12/2007 |
| CN | 201167441 Y | 12/2008 |
| CN | 101500390 A | 8/2009 |
| CN | 201651684 U | 11/2010 |
| CN | 201731242 U | 2/2011 |
| CN | 201787285 U | 4/2011 |
| CN | 201797285 U | 4/2011 |
| CN | 202025487 U | 11/2011 |
| CN | 102563297 A | 7/2012 |
| CN | 202353969 U | 7/2012 |
| CN | 103162068 A | 6/2013 |
| CN | 203131347 U | 8/2013 |
| DE | 102009000649 A1 | 8/2010 |
| DE | 202011001761 U1 | 5/2011 |
| FR | 2675442 A1 | 10/1992 |
| GB | 2445968 A | 7/2008 |
| JP | H04301673 A | 10/1992 |
| WO | 2008092910 A1 | 9/2006 |

OTHER PUBLICATIONS

European Search Report for corresponding European Patent Application No. 13877927.7 dated Oct. 21, 2016.
Search Report issued by State Intellectual Property Office (SIPO) for corresponding Chinese Patent Application No. 201310081786.X.
Office Action issued by State Intellectual Property Office (SIPO) for corresponding Chinese Patent Application No. 201310081786.X dated Jun. 27, 2014.
Supplementary Search Report for corresponding Chinese Patent Application No. 201310081786.X dated Oct. 22, 2014.

* cited by examiner

FIXING DEVICE

TECHNICAL FIELD OF THE DISCLOSURE

The disclosure relates to a fixing device.

BACKGROUND OF THE DISCLOSURE

At present, in order to display a display panel such as a LED display screen, a billboard, or a television wall for the public, it is necessary to mount the display panel on a fixing device. Most of fixing devices in the prior art are connected into a fixed through welded profiles, and then are connected with the display panel through bolts. To assemble the fixing device is not only time-consuming and labor-consuming, but also not reusable.

SUMMARY OF THE DISCLOSURE

A purpose of the disclosure is to provide a fixing device which is reusable and convenient to assemble and disassemble.

In order to achieve the purpose, the disclosure provides a fixing device, including: a pedestal, provided with a first chute extending along a first direction, a first limiting part being provided in the first chute; a bracket, detachably provided on the pedestal, wherein a slide block is provided on the bracket, a limited part adapted to the first limiting part in shape is provided on the slide block, and the first limiting part and the limited part form a buckled structure so as to fix the bracket on the pedestal along a vertical direction; and a connecting arm, wherein a first end of the connecting arm is provided on the bracket, and a mounting part connected with a display screen is provided at a second end of the connecting arm.

Further, the bracket includes a first connecting block, a second connecting block, and a vertical rod connected between the first connecting block and the second connecting block; the slide block is provided on the side, away from the second connecting block, of the first connecting block, a second chute is formed in the side, away from the first connecting block, of the second connecting block, and a second limiting part adapted to the limited part in shape is provided in the second chute.

Further, the bracket further includes a first fastener, and the slide block can move along an axial direction of the vertical rod under the action of the first fastener.

Further, the first connecting block is provided with a first through hole extending along the vertical direction; the first fastener includes: a locking rod, provided through the first through hole, wherein a first end of the locking rod is connected with the slide block, and an external thread is provided at a second end of the locking rod; an operating handle, wherein a locking part is formed at a first end of the operating handle, and the locking part is provided with an eccentric hole and an avoiding hole for avoiding the locking rod, an axis of the eccentric hole is perpendicular to that of the locking rod, and an axis of the avoiding hole is perpendicular to that of the eccentric hole; a rotating shaft, provided through the eccentric hole, wherein a first screw hole extending along an axial direction of the locking rod is provided in the rotating shaft, and the first screw hole is matched with the external thread of the locking rod, wherein, a position of the avoiding hole corresponds to that of the first screw hole.

Further, the first fastener further includes an elastic element; and the elastic element is provided on the locking rod in a sleeving way, and is positioned between the slide block and the first connecting block.

Further, the vertical rod is a cylindrical rod; a circular ring with a notch is provided at a first end of the connecting arm, and the circular ring is provided on the vertical rod in a sleeving way; and two lugs are provided on an edge of the notch of the circular ring, and the two lugs are connected through a second fastener so as to fix the circular ring and the corresponding vertical rod.

Further, there are two vertical rods, the connecting arm is provided on one of the two vertical rods, and a semicircular avoiding groove adapted to a surface of the other of the two vertical rods is provided in the connecting arm.

Further, the first limiting part is a limiting bump provided on an inner sidewall of the first chute.

Further, a first screw hole is provided in the pedestal; the fixing device further includes a support seat, and the support seat is provided with a screw matched with the first screw hole.

Further, a blocking bump for blocking the slide block to move along the first direction are provided in the first chute.

Further, there is a plurality of brackets; and there is a plurality of pedestals provided side by side along a direction perpendicular to the first direction, and at least one bracket is provided on each pedestal.

Further, a locating bump is provided on each pedestal; the fixing device further includes a locating base, and a first locating hole matched with the locating bump is provided in the locating base.

Further, there is a plurality of locating bases, a hook is provided at a first end of the locating base, a first accommodation groove for accommodating the hook is provided in a second end of the locating base, and the first accommodation groove is provided with a column matched with the hook, and the hook is connected with the column to connect the adjacent locating bases with each other along a direction perpendicular to the first direction.

Further, a second accommodation groove for accommodating the hook is provided in the first end of the locating base, the hook is provided in the second accommodation groove in a pivoting way through a spindle, and an end part of the spindle forms a driving end.

By the technical solution of the disclosure, when the fixing device is assembled, the pedestal is placed on the ground, and the slide block on the bracket can slide into the first chute of the pedestal. The first chute is provided with the first limiting part, and the limited part adapted to the first limiting part in shape is provided on the slide block. The first limiting part and the limited part can form the buckled structure when being matched, so that the bracket can be conveniently fixed on the pedestal without any tools. The first end of the connecting arm is provided on the bracket, and the mounting part is provided at the second end of the connecting arm capable of connecting with the display screen. Thus, it is convenient to fix the connecting arm only by connecting the display screen to the connecting arm. When the fixing device needs to be disassembled, the bracket can be separated from the pedestal only by sliding the slide block out of the first chute. From the above, the fixing device of the disclosure is reusable and convenient to assemble and disassemble.

BRIEF DESCRIPTION OF THE DRAWINGS

The drawings forming a part of the disclosure are described here to provide further understanding of the disclosure. The schematic embodiments and description of the disclosure are adopted to explain the disclosure, and do not form improper limits to the disclosure. In the drawings.

Figure 1:
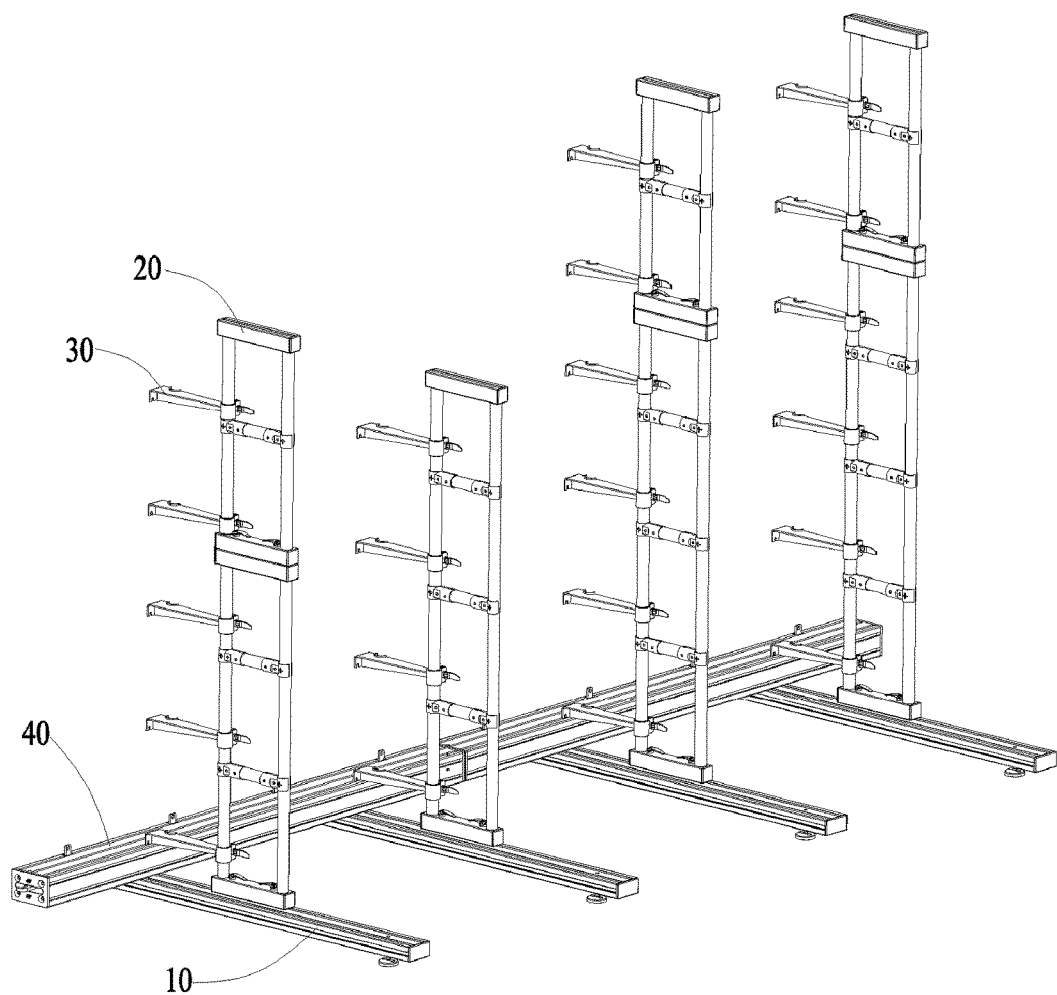
FIG. 1 is a structure view of an embodiment 1 of a fixing device according to the disclosure.

Wherein, drawing reference numerals in the drawings are as follows:

10. pedestal; 11. first chute; 12. locating bump; 13. first screw hole; 20. bracket; 21. slide block; 24. first connecting block; 25. second connecting block; 251. second chute; 22. first fastener; 23. vertical rod; 221. locking rod; 222. operating handle; 223. rotating shaft; 225. elastic element; 26. cross bar; 30. connecting arm; 31. mounting part; 32. circular ring; 33. lug; 34. second fastener; 35. semicircular avoiding groove; 40. locating base; 41. first locating hole; 42. hook; 43. first accommodation groove; 44. column; 45. second accommodation groove; 46. spindle; 50. support seat; and 51. screw.

DETAILED DESCRIPTION OF THE EMBODIMENTS

It should be noted that the embodiments of the disclosure and the characteristics in the embodiments can be combined under the condition of no conflicts. The disclosure is descried below with reference to the drawings and embodiments in detail.

Figure 2:
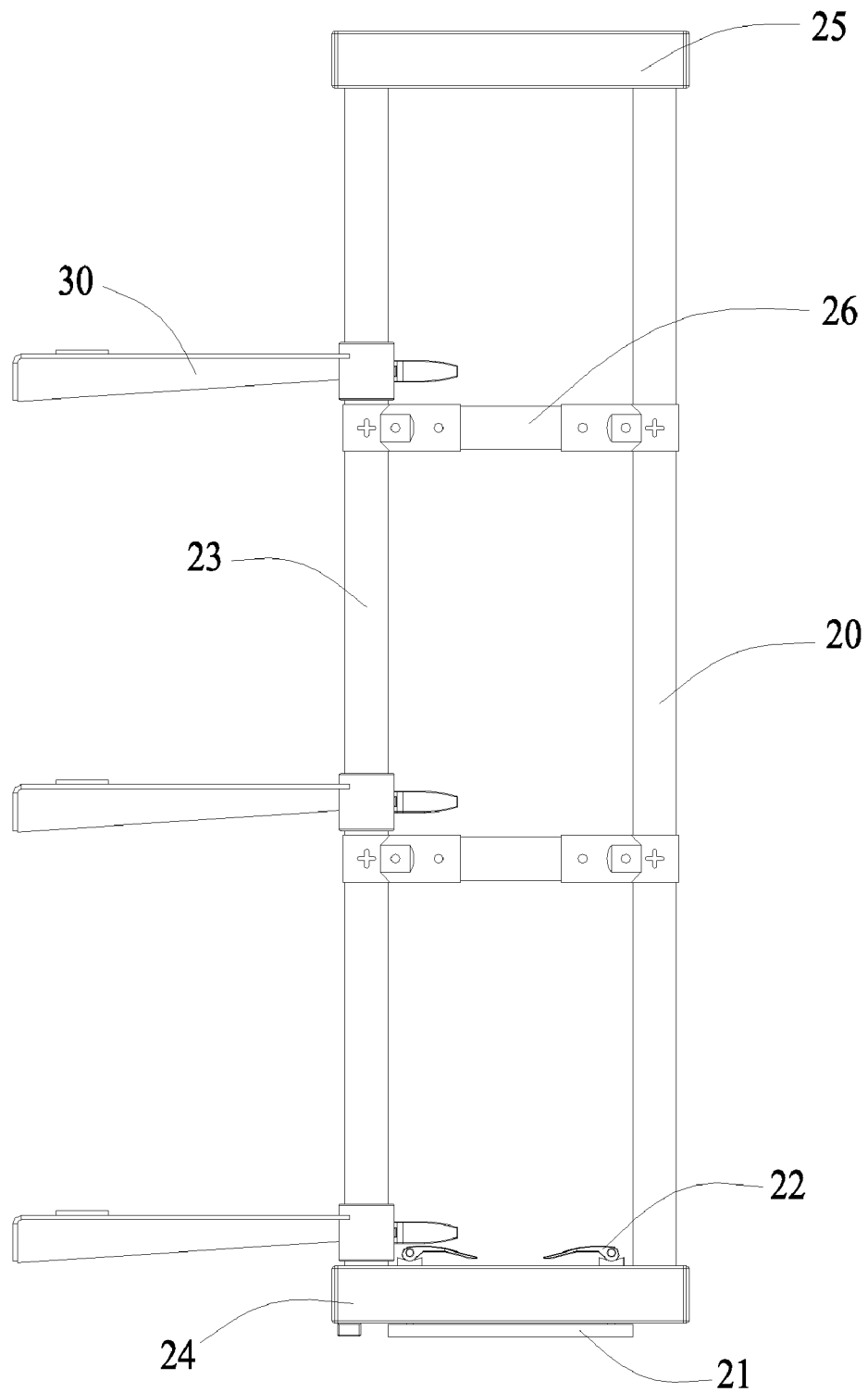
FIG. 2 is a front view of a bracket in the fixing device in FIG. 1.
Figure 7:
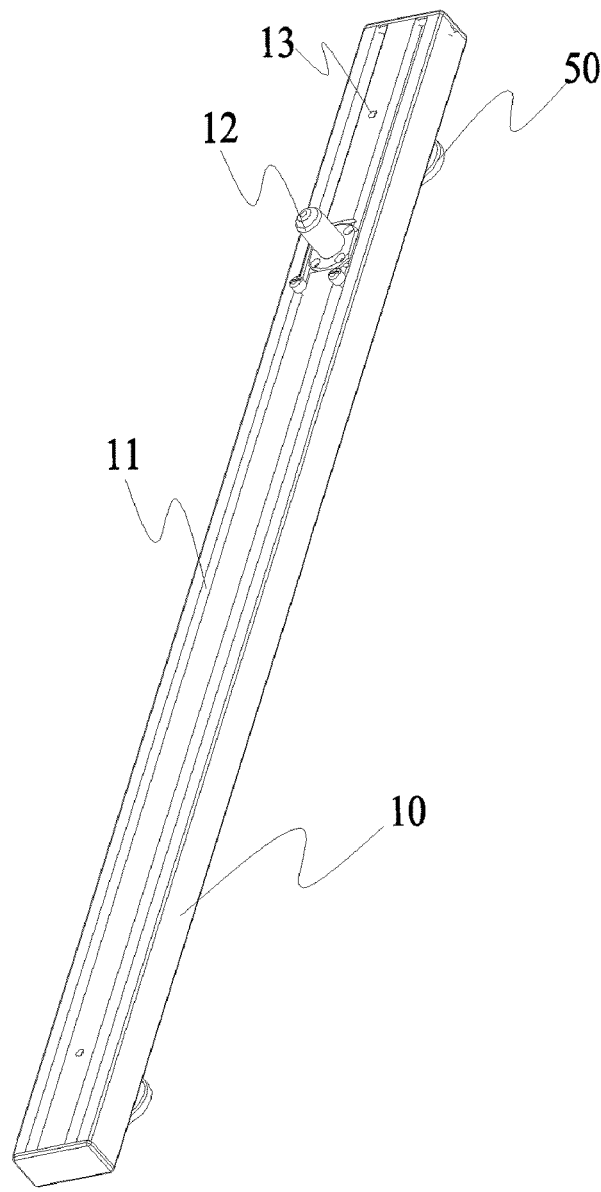
FIG. 7 is a three-dimensional view of a pedestal in the fixing device in FIG. 1.

As shown in FIG. 1, FIG. 2 and FIG. 7, a fixing device of an embodiment 1 includes a pedestal 10, a bracket 20, and a connecting arm 30. A first chute 11 extending along a first direction is provided in the pedestal 10, and a first limiting part is provided in the first chute 11. The bracket 20 is detachably provided on the pedestal 10, a slide block 21 is provided on the bracket 20, and a limited part adapted to the first limiting part is provided on the slide block 21. A first end of the connecting arm 30 is provided on the bracket 20, and a second end of the connecting arm 30 is provided with a display screen mounting part 31. Wherein, the first limiting part and the limited part forms a buckled structure, and the buckled structure makes the bracket 20 is fixed on the pedestal 10 in a vertical direction.

When the fixing device of the embodiment 1 is assembled, the pedestal 10 is placed on the ground, and the slide block 21 on the bracket 20 can slide into the first chute 11 of the pedestal 10. The first chute 11 is provided with the first limiting part, and the limited part adapted to the first limiting part in shape is provided on the slide block 21. Because the first limiting part and the limited part can form the buckled structure when being matched, thus, the bracket 20 can be conveniently fixed on the pedestal 10 without any tools. The first end of the connecting arm 30 is provided on the bracket 20, and the second end of the connecting arm 30 is provided with the display screen mounting part 31 capable of connecting to a display screen. Thus, it is convenient to fix the connecting arm 30 only by connecting the display screen to the connecting arm 30. When the fixing device of the embodiment 1 needs to be disassembled, the bracket 20 can be separated from the pedestal 10 only by sliding the slide block 21 out of the first chute 11. From the above, the fixing device of the embodiment 1 is reusable and convenient to assemble and disassemble.

Figure 3:
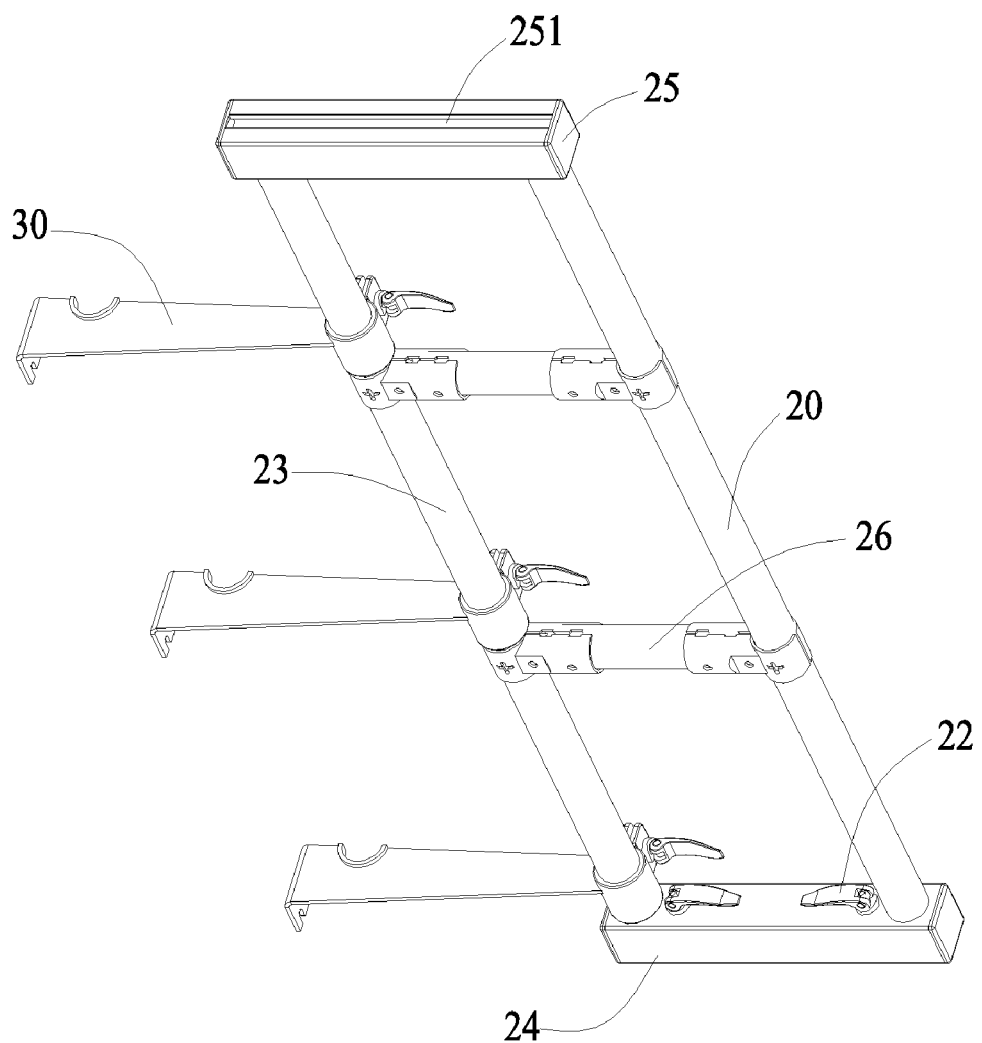
FIG. 3 is a three-dimensional view of the bracket in FIG. 2.

As shown in FIG. 2 and FIG. 3, in the embodiment 1, the bracket 20 includes a first connecting block 24, a second connecting block 25, and a vertical rod 23 connected between the first connecting block 24 and the second connecting block 25. The slide block 21 is provided on the side, away from the second connecting block 25, of the first connecting block 24, a second chute 251 is provided in the side, away from the first connecting block 24, of the second connecting block 25, and a second limiting part adapted to the limited part in shape is provided in the second chute 251. Therefore, the structure abovementioned facilitates to make a plurality of brackets 20 overlapped with each other along a vertical direction, and specifically, the slide block 21 of one bracket 20 slides into the second chute 251 of another bracket 20 which has been mounted on the pedestal 10, then the two brackets 20 can be connected together along the vertical direction, and the slide block 21 is limited in the second chute 251 along the vertical direction through the second limiting part. On one hand, according to a height of the LED display screen, a plurality of brackets 20 are overlapped to a height adapted to the LED display screen. On the other hand, when a total height of the fixing device comes to a certain height, a height of the bracket 20, i.e. a length of the vertical rod 23, can be shortened by increasing the number of the brackets 20 so as to facilitate the transportation of the brackets 20. In order to prevent the relative movement between two brackets 20 along a horizontal direction, two ends of the second connecting block 25 in the embodiment 1 are detachably connected to a blocking block, and the blocking block is used for blocking the second chute 251. After the slide block 21 is inserted into the first chute 11 or the second chute 251, two ends of the second connecting blocks 25 are connected to the blocking block.

In the embodiment 1, the first limiting part is preferably a limiting bump provided on inner sidewall of the first chute 11, and the second chute 251 has a same structure as the first chute 11. As a feasible way, the first chute 11 can be a dovetail groove, a longitudinal section of the slide block 21 is a trapezoid adapted to a sectional shape of the first chute 11, and the first limiting part of the first chute 11 limits the slide block 21 along the vertical direction.

In the embodiment 1, the first connecting block 24 is provided with a first through hole extending along a vertical direction. The bracket 20 further includes a first fastener 22, and the slide block 21 can move along an axial direction of the vertical rod 23 under the action of the first fastener 22. When the first limiting part of the first chute 11 closely clings to the limited part of the slide block 21, the first fastener 22 is driven to drive the slide block 21 to move towards the limiting bump of the first chute 11 or the second chute 251 so as to make the slide block 21 closely cling to the limiting bump. The bracket 20 will not sway in the vertical direction, and under the action of frictional force between the slide block 21 and the limiting bump, the bracket 20 provided on the pedestal 10 will not move relative to the pedestal 10 along the horizontal direction. As a feasible implementation mode, the first fastener 22 could be a bolt, and a bolt bar passes through the first through hole to form a threaded connection with the slide block 21, and the bolt bar can be moved relative to the slide block 21 by rotating bolt head to realize a movement of the slide block 21 along the an axial direction of the vertical rod 23.

Figure 4:
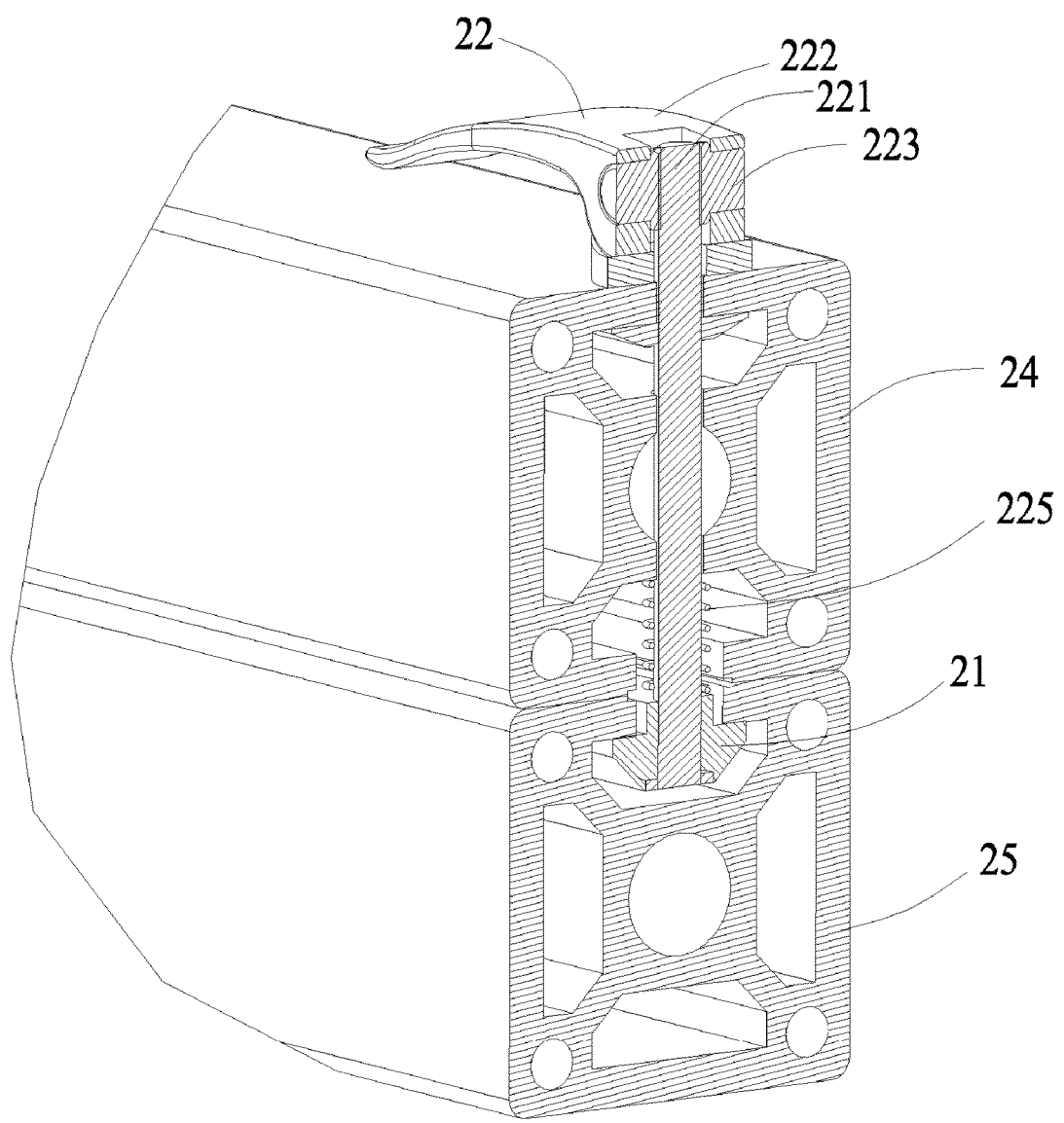
FIG. 4 is a partial enlarged section view of a joint between two adjacent brackets of the fixing device in FIG. 1.

As shown in FIG. 4, in the embodiment 1, the first fastener 22 includes a locking rod 221, an operating handle 222, and a rotating shaft 223. The locking rod 221 is provided through the first through hole, a first end of the locking rod 221 is connected with the slide block 21, and an external thread is provided at a second end of the locking rod 221. A locking part is formed at a first end of the operating handle 222, and the locking part is provided with an eccentric hole, and an avoiding hole for avoiding the locking rod 221, an axis of the eccentric hole is perpendicular to that of the locking rod 221, and an axis of the avoiding hole is perpendicular to that of the eccentric hole. The rotating shaft 223 is provided through the eccentric hole of the operating handle 222, a first screw hole extending along an axial direction of the locking rod 221 is provided in the rotating shaft 223, and the first screw hole is matched with an external thread of the locking rod 221, and a position of the avoiding hole corresponds to that of the first screw hole. The first end of the locking rod 221 and the slide block 21 should only satisfy not to rotate relative to each other, and preferably are fixedly connected.

In the embodiment 1, when the first limiting part of the first chute 11 closely clings to the limited part of the slide block 21, the operating handle 222 rotates around the rotating shaft so as to make the distance between the rotating shaft 223 and the first connecting block 24 shortest. The operating handle 222 rotates around the locking rods 221, and the operating handle 222 drives the rotating shaft 223 to rotate. The locking rod 221 moves relative to the rotating shaft 223 in the axial direction of the locking rod 221, and the locking rod 221 drives the slide block 21 to move towards the operating handle 222, and the slide block 21 closely clings to the limiting bump. Then, the operating handle 222 reversely rotates around the rotating shaft 223 to make the distance between the rotating shaft 223 and the first connecting block 24 maximally. At this moment, the slide block 21 more closely clings to the limiting bump so as to increase a frictional force between the slide block 21 and the limiting bump, thereby making the connection between the bracket 20 and the bracket 20, or between the bracket 20 and the pedestal 10 more reliably.

As shown in FIG. 4, in the embodiment 1, the first fastener 22 further includes an elastic element 225. The elastic element 225 is provided on the locking rod 221 in a sleeving way, and is positioned between the slide block 21 and the first connecting block 24. When the slide block 21 is separated from the first chute 11 or the second chute 251, the slide block 21 is separated from the first connecting block 24 under the action of elasticity of the elastic element 225. Therefore, the elastic element 225 facilitates the slide block 21 to slide into the first chute 11 or the second chute 251.

Figure 5:
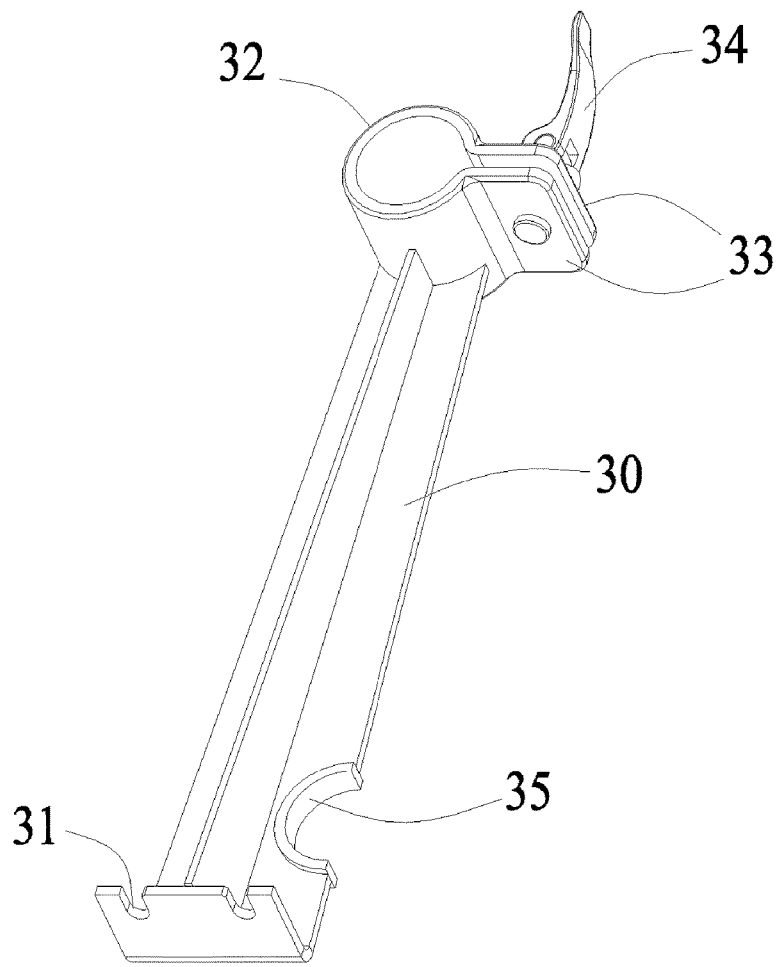
FIG. 5 is a three-dimensional view of a connecting arm in the fixing device in FIG. 1.

As shown in FIG. 3 and FIG. 5, in the embodiment 1, the vertical rod 23 is a cylindrical rod, a circular ring 32 with a notch is provided at a first end of the connecting arm 30, and the circular ring 32 is provided on the vertical rod 23 in the sleeving way, and two lugs 33 are provided on an edge of the notch of the circular ring 32. The connecting arm 30 further includes a second fastener 34, and the second fastener 34 is provided through the two lugs 33, and the second fastener 34 fixes the circular ring 32 on the vertical rod 23. In the embodiment 1, the second fastener 34 has same structure as the first fastener 22. Of course, as a feasible implementation mode, the second fastener 34 can also adopt a bolt.

Figure 6:
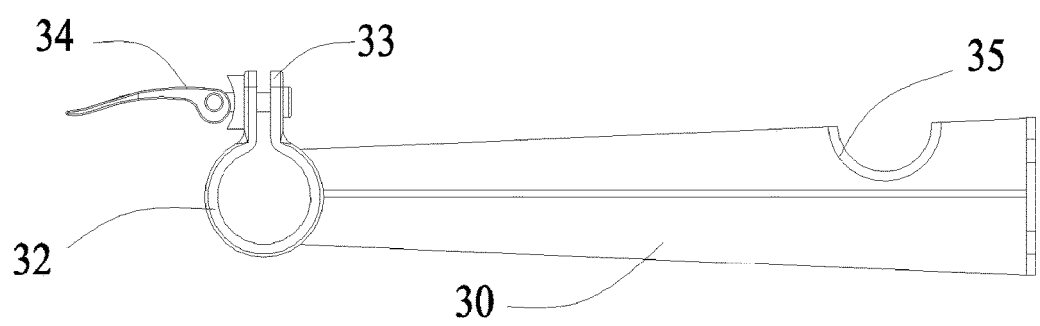
FIG. 6 is a front view of the connecting arm in FIG. 5.

As shown in FIG. 3 and FIG. 6, in the embodiment 1, there are two vertical rods 23, the connecting arm 30 is provided on one of the two vertical rods 23, and a semicircular avoiding groove 35 adapted to a surface of the other of the two vertical rods 23 is provided in the connecting arm 30. When the bracket 20 is transported, the connecting arms 30 are rotated to make the semicircular avoiding groove 35 cling to the surface of the vertical rod 23, so that a size of the bracket 20 is reduced to facilitate transportation. In the embodiment 1, in order to improve the stability of the two vertical rods 23, a cross bar 26 is connected between the two vertical rods 23.

Figure 8:
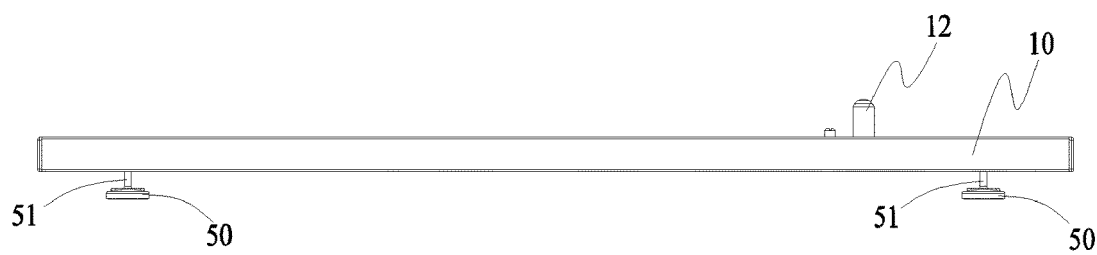
FIG. 8 is a front view of the pedestal in FIG. 7.

As shown in FIG. 7 and FIG. 8, in the embodiment 1, two first screw holes 13 are provided in the pedestal 10. The fixing device of the embodiment 1 further includes a support seat 50, and the support seat 50 is provided with a screw 51 matched with the first screw hole 13. By the matching between the first screw hole 13 and the screw 51, the pedestal 10 can ascend and descend so as to further adjust the horizontal levelness of the fixing device of embodiment 1.

In the embodiment 1, a blocking bump for blocking the slide block 21 to move along a first direction is provided in the first chute 11. The slide block 21 is fixed at specified position under a blocking function of the blocking bump, thereby improving the levelness of the LED display screen.

As shown in FIG. 1, in the embodiment 1, there is a plurality of the brackets 20 and a plurality of pedestals 10, and one or two brackets 20 are provided on each pedestal 10. To provide a plurality of pedestals 10 can reduce the size of the pedestal so as to facilitate the transportation of the pedestal. In the embodiment 1, the plurality of pedestals 10 are provided side by side along a direction perpendicular to the first direction, and such a way improves the stability. As a feasible mode, when the plurality of pedestals 10 are provided side by side, it needs to rotate the connecting arm 30 to a position parallel to the pedestal 10.

Figure 9:
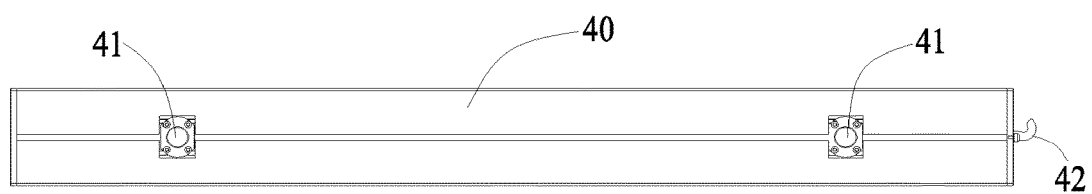
FIG. 9 is a bottom view of a locating base in the fixing device in FIG. 1.
Figure 10:
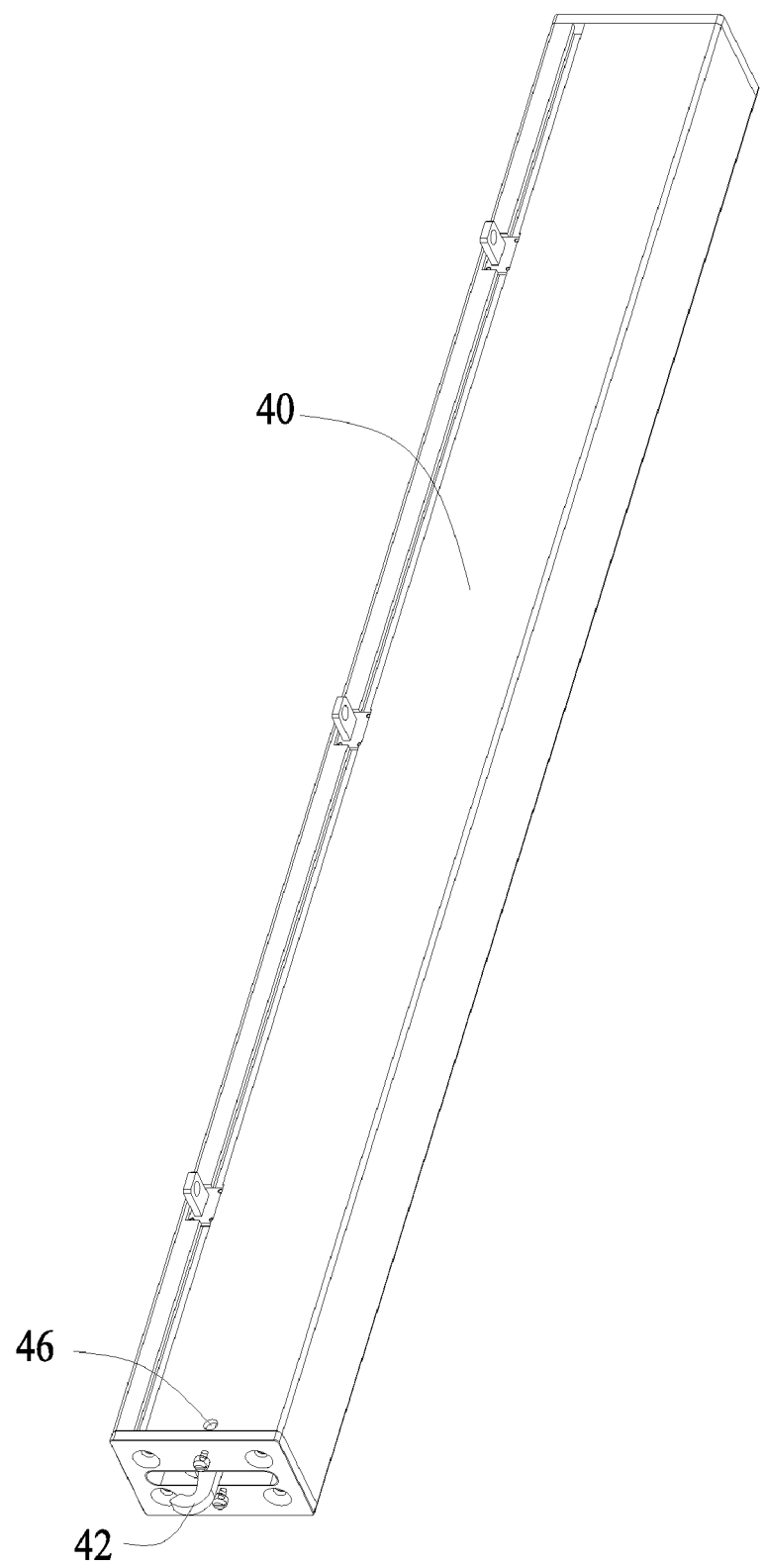
FIG. 10 is a three-dimensional view of the locating base in FIG. 9.
Figure 12:
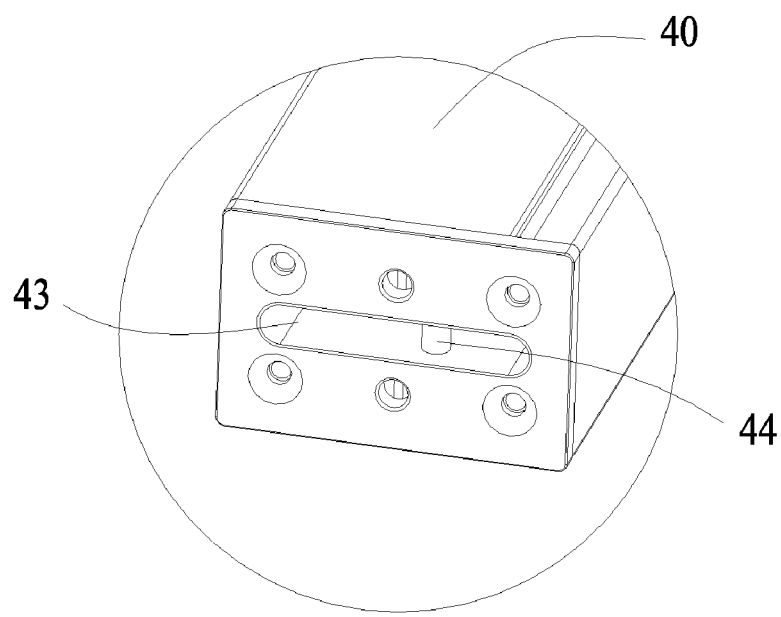
FIG. 12 is a drawing of partial enlargement of a second end of the locating base in FIG. 9.

As shown in FIG. 8 and FIG. 9, in the embodiment 1, a locating bump 12 is provided on each pedestal 10. The fixing device of the embodiment 1 further includes a locating base 40, provided with a plurality of first locating holes 41 matched with the locating bumps 12. As shown in FIG. 1, FIG. 10 and FIG. 12, there is a plurality of locating bases 40. A hook 42 is provided at first end of the locating base 40, a first accommodation groove 43 for accommodating the hook 42 is provided in a second end of the locating base 40. The first accommodation groove 43 is provided with a column 44 matched with the hook 42, and the hook 42 is connected with the column 44 so as to connect every two adjacent locating bases 40 with each other along the direction perpendicular to the first direction. By such a way, the plurality of locating bases 40 can be conveniently connected with one another.

Figure 11:
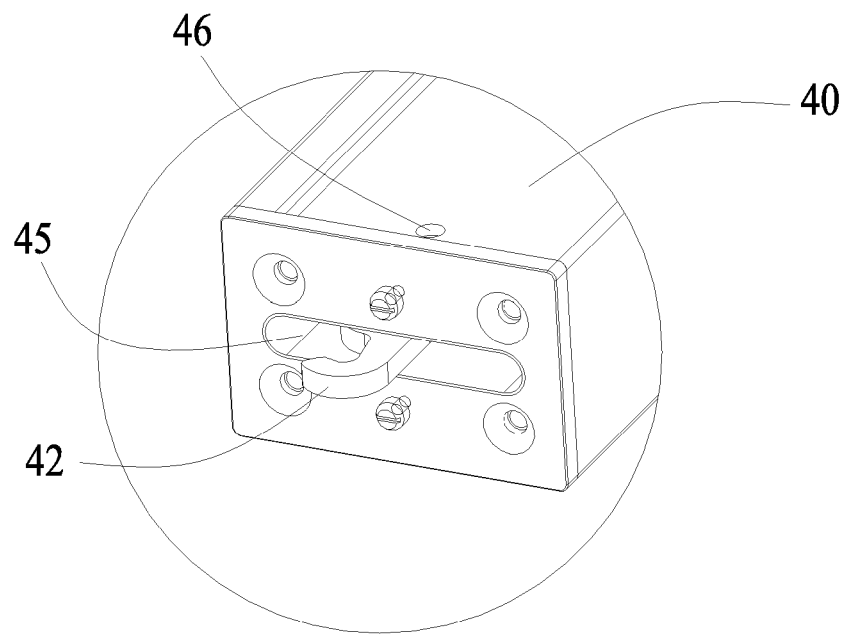
FIG. 11 is a drawing of partial enlargement of a first end of the locating base in FIG. 9.

As shown in FIG. 10 and FIG. 11, a second accommodation groove 45 for accommodating the hook 42 is provided in the first end of the locating base 40, the hook 42 is provided in the second accommodation groove 45 in a pivoting way through a spindle 46, and an end part of the spindle 46 forms a driving end. When the locating base 40 is transported, the driving end of the spindle 46 can be rotated to rotate the hook 42 into the second accommodation groove 45, and such a way can make the transportation of the locating base 40 more conveniently.

Figure 13:
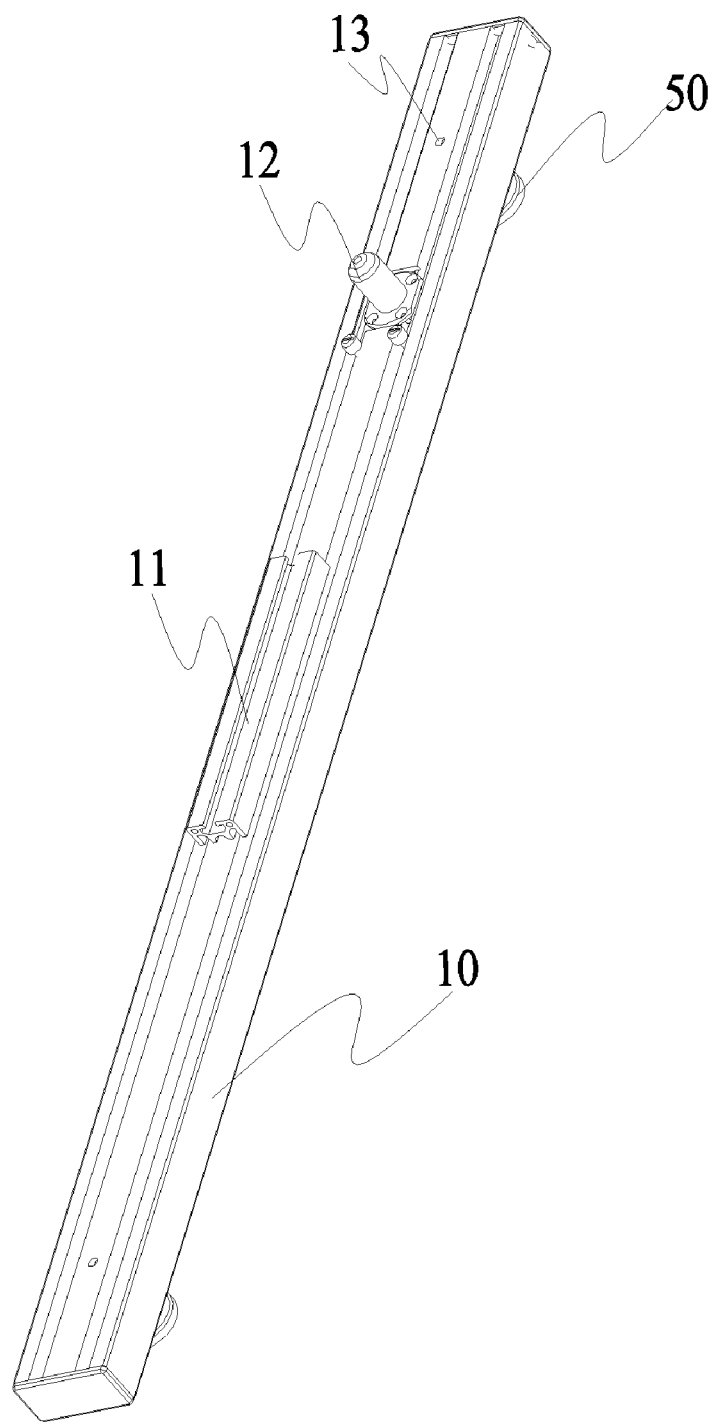
FIG. 13 is a three-dimensional view of a pedestal of embodiment 2 of a fixing device according to the disclosure.

As shown in FIG. 13, a difference between a fixing device of an embodiment 2 and the fixing device of the embodiment 1 is that a bump is also provided on the pedestal 10, and the first chute 11 is formed on the bump. The assembly and disassembly processes of the fixing device of the embodiment 2 are similar to those of the fixing device of the embodiment 1, and will not be repeated here.

The above is only the preferred embodiment of the disclosure and not intended to limit the disclosure. For those skilled in the art, the disclosure can have various modifications and variations. Any modifications, equivalent replacements, improvements and the like within the spirit and principle of the disclosure shall fall within the scope of protection of the disclosure.

What is claimed is:

1. A fixing device, comprising:
   a pedestal (10), provided with a first chute (11) extending along a first direction, a first limiting part being provided in the first chute (11);
   a bracket (20), detachably provided on the pedestal (10), wherein a slide block (21) is provided on the bracket (20), a limited part adapted to the first limiting part in shape is provided on the slide block (21), and the first limiting part and the limited part form a buckled structure so as to fix the bracket (20) on the pedestal (10) along a vertical direction; and
   a connecting arm (30), wherein a first end of the connecting arm (30) is provided on the bracket (20), and a mounting part (31) connected with a display screen is provided at a second end of the connecting arm (30);
   the bracket (20) comprises a first connecting block (24), a second connecting block (25), and a vertical rod (23) connected between the first connecting block (24) and the second connecting block (25);
   the slide block (21) is provided on a side, away from the second connecting block (25), of the first connecting block (24), a second chute (251) is formed in a side, away from the first connecting block (24), of the second connecting block (25), and a second limiting part adapted to the limited part in shape is provided in the second chute (251).

2. The fixing device according to claim 1, wherein the bracket (20) further comprises a first fastener (22), and the slide block (21) can move along an axial direction of the vertical rod (23) under an action of the first fastener (22).

3. The fixing device according to claim 2, wherein
   the first connecting block (24) is provided with a first through hole extending along the vertical direction;
   the first fastener (22) comprises:
      a locking rod (221), provided through the first through hole, wherein a first end of the locking rod (221) is connected with the slide block (21), and an external thread is provided at a second end of the locking rod (221);
      an operating handle (222), wherein a locking part is formed at a first end of the operating handle (222), and the locking part is provided with an eccentric hole and an avoiding hole for avoiding the locking rod (221), an axis of the eccentric hole is perpendicular to that of the locking rod (221), and an axis of the avoiding hole is perpendicular to that of the eccentric hole;
      a rotating shaft (223), provided through the eccentric hole, wherein a first screw hole extending along an axial direction of the locking rod (221) is provided in the rotating shaft (223), and the first screw hole is matched with the external thread of the locking rod (221), wherein, a position of the avoiding hole corresponds to that of the first screw hole.

4. The fixing device according to claim 3, wherein the first fastener (22) further comprises an elastic element (225); and the elastic element (225) is provided on the locking rod (221) in a sleeving way, and is positioned between the slide block (21) and the first connecting block (24).

5. The fixing device according to claim 1, wherein the vertical rod (23) is a cylindrical rod; a circular ring (32) with a notch is provided at the first end of the connecting arm (30), and the circular ring (32) is provided on the vertical rod (23) in a sleeving way; and two lugs (33) are provided on an edge of the notch of the circular ring (32), and the two lugs are connected through a second fastener (34) so as to fix the circular ring (32) and the corresponding vertical rod (23).

6. The fixing device according to claim 5, wherein there are two vertical rods (23), the connecting arm (30) is provided on one of the two vertical rods (23), and a semicircular avoiding groove (35) adapted to a surface of the other of the two vertical rods (23) is provided in the connecting arm (30).

7. The fixing device according to claim 1, wherein the first limiting part is a limiting bump provided on an inner sidewall of the first chute (11).

8. The fixing device according to claim 1, wherein a first screw hole (13) is provided in the pedestal (10); the fixing device further comprises a support seat (50), and the support seat (50) is provided with a screw (51) matched with the first screw hole (13).

9. The fixing device according to claim 1, wherein a blocking bump for blocking the slide block (21) to move along the first direction is provided in the first chute (11).

10. The fixing device according to claim 1, wherein
    there is a plurality of brackets (20); and
    there is a plurality of pedestals (10) provided side by side along a direction perpendicular to the first direction, and at least one bracket (20) is provided on each pedestal (10).

11. The fixing device according to claim 10, wherein a locating bump (12) is provided on each pedestal (10); the fixing device further comprises a locating base (40), and a first locating hole (41) matched with the locating bump (12) is provided in the locating base (40).

12. The fixing device according to claim 11, wherein there is a plurality of locating bases (40), a hook (42) is provided at a first end of the locating base (40), a first accommodation groove (43) for accommodating the hook (42) is provided in a second end of the locating base (40), and the first accommodation groove (43) is provided with a column (44) matched with the hook (42), and the hook (42) is connected with the column (44) to connect the adjacent locating bases (40) with each other along a direction perpendicular to the first direction.

13. The fixing device according to claim 12, wherein a second accommodation groove (45) for accommodating the hook (42) is provided in the first end of the locating base (40), the hook (42) is provided in the second accommodation groove (45) in a pivoting way through a spindle (46), and an end part of the spindle (46) forms a driving end.

\* \* \* \* \*